US012744209B2

(12) United States Patent
Cho et al.

(10) Patent No.: US 12,744,209 B2
(45) Date of Patent: Sep. 22, 2026

(54) LITHIUM SECONDARY BATTERY

(71) Applicants: SK ON CO., LTD., Seoul (KR); SK INNOVATION CO., LTD., Seoul (KR)

(72) Inventors: In Haeng Cho, Daejeon (KR); Jung Hwan Kim, Daejeon (KR); Sang Han Lee, Daejeon (KR); Jong Hyuk Lee, Daejeon (KR); Dong Wook Ha, Daejeon (KR)

(73) Assignee: SK On Co., Ltd., Seoul (KR)

( * ) Notice: Subject to any disclaimer, the term of this patent is extended or adjusted under 35 U.S.C. 154(b) by 796 days.

(21) Appl. No.: 18/092,937

(22) Filed: Jan. 4, 2023

(65) Prior Publication Data

US 2023/0223530 A1 Jul. 13, 2023

(30) Foreign Application Priority Data

Jan. 7, 2022 (KR) ........................ 10-2022-0002900

(51) Int. Cl.
*H01M 4/00* (2006.01)
*H01M 4/04* (2006.01)
(Continued)

(52) U.S. Cl.
CPC ......... *H01M 4/525* (2013.01); *H01M 4/0404* (2013.01); *H01M 4/364* (2013.01); (Continued)

(58) Field of Classification Search
CPC .... H01M 4/525; H01M 4/0404; H01M 4/364; H01M 4/485; H01M 4/505; H01M 4/131; (Continued)

(56) References Cited

U.S. PATENT DOCUMENTS

2005/0031963 A1* 2/2005 Im ........................ H01M 10/052 429/200
2011/0165474 A1* 7/2011 Im ..................... H01M 10/0569 429/332
(Continued)

FOREIGN PATENT DOCUMENTS

CN 112768686 A 5/2021
KR 10-2019-0062228 A 6/2019
(Continued)

OTHER PUBLICATIONS

KR20190131721A Translation (Year: 2019).*
(Continued)

*Primary Examiner* — Nicholas P D'Aniello
(74) *Attorney, Agent, or Firm* — IP & T GROUP LLP

(57) ABSTRACT

A lithium secondary battery includes a cathode including a cathode current collector and a cathode active material layer disposed on at least one surface of the cathode current collector, the cathode active material layer including a cathode active material including first cathode active material particles, each of which has a single particle shape; an anode facing the cathode; and a non-aqueous electrolyte including a non-aqueous organic solvent that contains a fluorine-based organic solvent, a lithium salt and an additive.

8 Claims, 1 Drawing Sheet

(51) Int. Cl.

| | |
|---|---|
| ***H01M 4/36*** | (2006.01) |
| ***H01M 4/485*** | (2010.01) |
| ***H01M 4/505*** | (2010.01) |
| ***H01M 4/525*** | (2010.01) |
| ***H01M 10/052*** | (2010.01) |
| ***H01M 10/0567*** | (2010.01) |
| ***H01M 10/0568*** | (2010.01) |
| ***H01M 10/0569*** | (2010.01) |
| *H01M 4/02* | (2006.01) |

(52) U.S. Cl.
CPC ........... *H01M 4/485* (2013.01); *H01M 4/505* (2013.01); *H01M 10/052* (2013.01); *H01M 10/0567* (2013.01); *H01M 10/0568* (2013.01); *H01M 10/0569* (2013.01); *H01M 2004/028* (2013.01); *H01M 2300/0034* (2013.01); *H01M 2300/0037* (2013.01)

(58) Field of Classification Search
CPC .... H01M 4/366; H01M 4/5825; H01M 4/382; H01M 4/48; H01M 10/052; H01M 10/0567; H01M 10/0568; H01M 10/0569; H01M 10/0525; H01M 10/0566; H01M 2004/028; H01M 2300/0034; H01M 2300/0037; H01M 2300/0025; Y02E 60/10
See application file for complete search history.

(56) References Cited

U.S. PATENT DOCUMENTS

| | | | | |
|---|---|---|---|---|
| 2014/0227611 | A1* | 8/2014 | Nakamura ........ | H01M 10/0569 429/327 |
| 2019/0089003 | A1* | 3/2019 | Noguchi ............... | H01M 4/505 |
| 2019/0393479 | A1* | 12/2019 | Kim ........................ | H01M 4/66 |
| 2020/0161704 | A1† | 5/2020 | Deng | |
| 2020/0185714 | A1† | 6/2020 | Han | |
| 2020/0274200 | A1 | 8/2020 | Koyama et al. | |
| 2021/0066743 | A1* | 3/2021 | Do ........................ | H01M 4/505 |

FOREIGN PATENT DOCUMENTS

| | | | | |
|---|---|---|---|---|
| KR | 10-2019-0119615 | A | | 10/2019 |
| KR | 10-2019-0131721 | A | † | 11/2019 |
| KR | 10-2019-0134668 | A | | 12/2019 |
| KR | 10-2020-0070649 | A | | 6/2020 |
| KR | 10-2021-0026499 | A | | 3/2021 |
| KR | 10-2021-0070893 | A | | 6/2021 |

OTHER PUBLICATIONS

Third Party Observation for Application No. EP22216969.0 issued by the European Patent Office on Oct. 24, 2024.
Extended European Search Report on the European Patent Application No. 22216969.0 issued by the European Patent Office on Aug. 16, 2023.
Office Action for Korean Patent Application No. 10-2022-0002900 issued by the Korean Intellectual Property Office (KIPO) on Oct. 20, 2025.

* cited by examiner
† cited by third party

LITHIUM SECONDARY BATTERY

CROSS-REFERENCE TO RELATED APPLICATION AND CLAIM OF PRIORITY

This application claims priority to Korean Patent Applications No. 10-2022-0002900 filed on Jan. 7, 2022 in the Korean Intellectual Property Office (KIPO), the entire disclosure of which is incorporated by reference herein.

BACKGROUND

1. Field

The present invention relates to a lithium secondary battery. More particularly, the present invention relates to a lithium secondary battery including a cathode, an anode and an electrolyte.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid vehicle.

A lithium secondary battery is highlighted and developed among various types of secondary batteries due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape accommodating the electrode assembly and the electrolyte.

A lithium metal oxide may be used as an active material for the cathode of the lithium secondary battery. Examples of the lithium metal oxide include a nickel-based lithium metal oxide.

As an application of the lithium secondary battery is expanded, higher capacity, life-span and operation stability are required.

However, power and capacity may be decreased due to surface damages of the nickel-based lithium metal oxide used as the cathode active material, and side reactions between the nickel-based lithium metal oxide and the electrolyte may occur.

Korean Published Patent Application No. 10-2019-0119615 discloses a method of improving battery properties by modifying a non-aqueous electrolyte for a lithium secondary battery.

SUMMARY

According to an aspect of the present invention, there is provided a lithium secondary battery having improved operation stability and electrical property.

A lithium secondary battery includes a cathode including a cathode current collector and a cathode active material layer disposed on at least one surface of the cathode current collector, the cathode active material layer including a cathode active material that includes first cathode active material particles, each of which has a single particle shape, an anode facing the cathode, and a non-aqueous electrolyte including a non-aqueous organic solvent that contains a fluorine-based organic solvent, a lithium salt and an additive.

In some embodiments, the cathode active material may further include second cathode active material particles, each of which has a secondary particle shape, and a content of the first cathode active material particles based on a total weight of the cathode active material may be in a range from 10 wt % to 40 wt %.

In some embodiments, the first cathode active material particles or the second cathode active material particles may have a structure of a lithium-transition metal composite oxide particle represented by Chemical Formula 1.

[Chemical Formula 1]

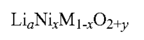

$Li_aNi_xM_{1-x}O_{2+y}$

In Chemical Formula 1, $0.9 \le a \le 1.2$, $0.5 \le x \le 0.99$, $-0.1 \le y \le 0.1$, and M includes at least one element selected from Na, Mg, Ca, Y, Ti, Hf, V, Nb, Ta, Cr, Mo, W, Mn, Co, Fe, Cu, Ag, Zn, B, Al, Ga, C, Si, Sn, Ba and Zr.

In some embodiments, the non-aqueous organic solvent may further include a non-fluorine-based organic solvent, and a volume ratio of the fluorine-based organic solvent to the non-fluorine-based organic solvent may be in a range from 1.5 to 9.

In some embodiments, the non-fluorine-based organic solvent may include at least one selected from the group consisting of a carbonate-based solvent, an ester-based solvent, an ether-based solvent, a ketone-based solvent, an alcohol-based solvent and an aprotic solvent.

In some embodiments, the fluorine-based organic solvent may include at least one of a monofluoro-based organic solvent and a difluoro-based organic solvent.

In some embodiments, the monofluoro-based organic solvent may be represented by Chemical Formula 2.

[Chemical Formula 2]

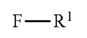

In Chemical Formula 2, $R^1$ is a substituted or unsubstituted $C_1$-$C_6$ alkyl group, a substituted or unsubstituted $C_6$-$C_{12}$ aryl group, a substituted or unsubstituted $C_5$-$C_{12}$ cycloalkyl group, a substituted or unsubstituted $C_5$-$C_{12}$ cycloalkenyl group, a substituted or unsubstituted 5 to 7 membered heterocycloalkyl group, or a substituted or unsubstituted 5 to 7 membered heterocycloalkenyl group.

In some embodiments, the difluoro-based organic solvent may be represented by Chemical Formula 3.

[Chemical Formula 3]

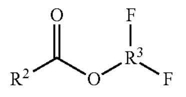

In Chemical Formula 3, $R^2$ is a hydrocarbon containing a substituted or unsubstituted $C_1$-$C_6$ alkyl group or a substituted or unsubstituted $C_6$-$C_{12}$ aryl group, and $R^3$ is a hydrocarbon including a substituted or unsubstituted $C_1$-$C_6$ alkyl group or a substituted or unsubstituted $C_2$-$C_6$ alkenyl group.

In some embodiments, the additive may include a boron-based compound.

In some embodiments, the boron-based compound may include at least one of lithium bis(oxalate) borate (LiBOB), tris(trimethylsilyl) borate (TMSB) and lithium difluoro(oxalato) borate (LiFOB).

In some embodiments, a content of the additive may be in a range from 0.1 wt % to 1.0 wt % based on a total weight of the non-aqueous electrolyte.

In some embodiments, the non-aqueous electrolyte may further include an auxiliary additive including an alkyl sultone-based compound and an alkenyl sultone-based compound.

In some embodiments, a content of the auxiliary additive is in a range from 0.5 wt % to 1.5 wt % based on a total weight of the non-aqueous electrolyte.

In some embodiments, the lithium salt may include at least one of lithium tetrafluoroborate ($LiBF_4$), lithium hexafluorophosphate ($LiPF_6$) and lithium difluorophosphate ($LiPO_2F_2$).

A lithium secondary battery according to embodiments of the present invention includes a cathode active material including first cathode active material particles of a single particle shape and a non-aqueous electrolyte including a fluorine-based organic solvent.

The cathode active material may include particles in the form of the single particle so that cracks of the cathode active material may be reduced and a BET surface area reacting with the electrolyte may be reduced. Thus, life-span properties of the lithium secondary battery and a capacity retention rate during repeated charging and discharging may be improved.

Additionally, an oxidation resistance of the secondary battery may be improved by the fluorine-based organic solvent in the non-aqueous electrolyte. Accordingly, the life-span properties of the lithium secondary battery may be improved and an amount of gas generated at a high temperature may be reduced.

A side reaction between the cathode active material particles and the non-aqueous electrolyte may be further suppressed by the combination of the cathode active material including the first cathode active material particles in the form of the single particles and the non-aqueous electrolyte solution including the fluorine-based organic solvent. Thus, an additional synergistic effect of improving the life-span and high-temperature storage properties may be implemented.

DETAILED DESCRIPTION OF THE EMBODIMENTS

Embodiments of the present invention provide a lithium secondary battery including a cathode, an anode and a non-aqueous electrolyte.

Hereinafter, the present invention will be described in detail with reference to exemplary embodiments and the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
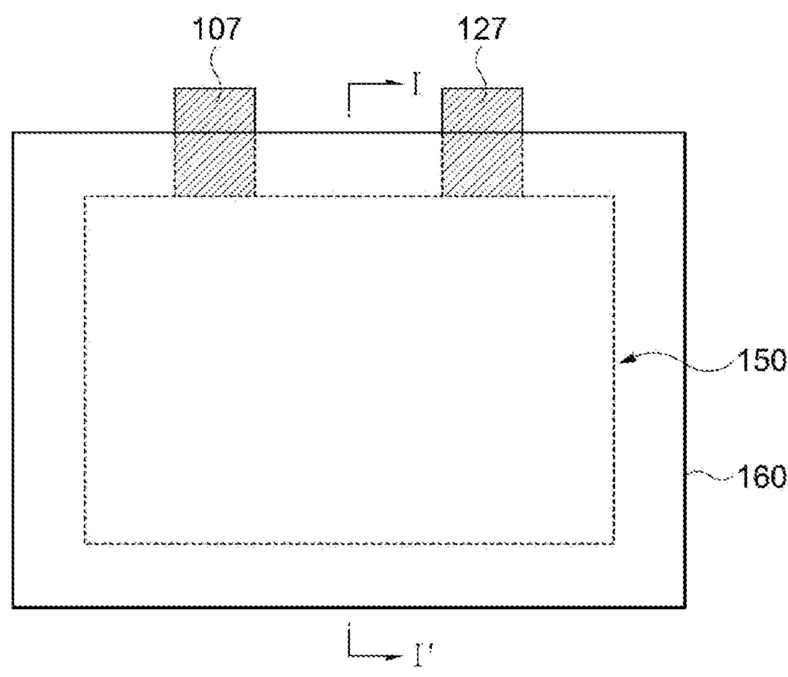
FIGS. 1 and 2 are a schematic plan view and a schematic cross-sectional view, respectively, illustrating a lithium secondary battery in accordance with exemplary embodiments.
Figure 2:
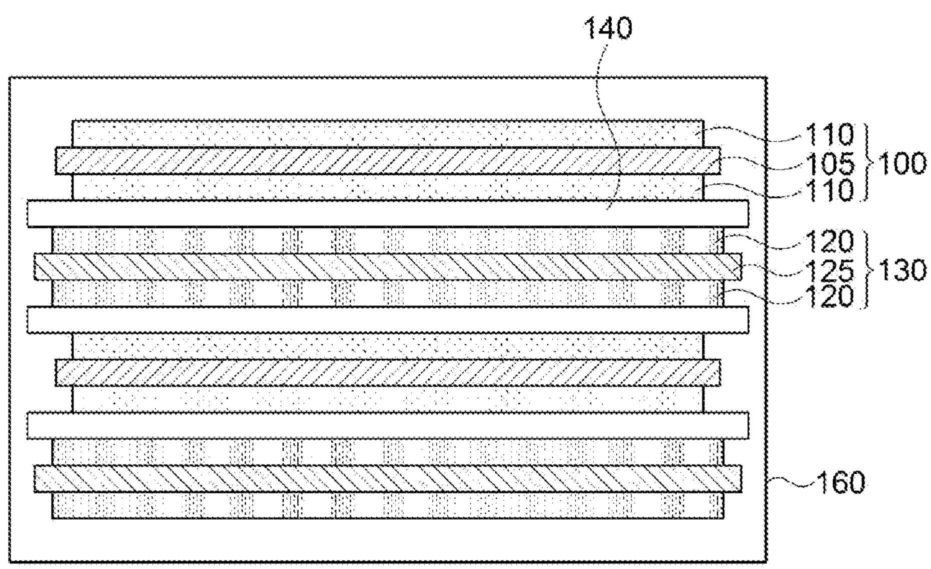

FIGS. 1 and 2 are a schematic plan view and a schematic cross-sectional view, respectively, illustrating a lithium secondary battery (that may be abbreviated as a secondary battery) in accordance with exemplary embodiments. For example, FIG. 2 is a cross-sectional view taken along a line I-I' of FIG. 1.

Referring to FIG. 1, the lithium secondary battery may include a cathode 100 and an anode 130 facing the cathode 100.

The cathode 100 includes a cathode current collector 105 and a cathode active material layer 110 disposed on at least one surface of the cathode current collector. The cathode active material layer 110 includes a cathode active material including first cathode active material particles having a single particle shape.

The term "single particle shape" as used herein is intended to exclude a secondary particles substantially formed into one particle by aggregation of, e.g., a plurality of primary particles. For example, the first cathode active material particles may substantially consist of particles having the single particle shape, and may not include the secondary particle in which primary particles (e.g., more than 10, 20 or more, 30 or more, 40 or more, 50 or more, etc.) are aggregated.

The term "single particle shape" used herein is not intended to exclude, e.g., a monolithic shape that 2 to 10 primary particles are attached or adhered to each other to form a single body.

In some embodiments, the first cathode active material particle may include a structure in which a plurality of primary particles are integrally merged into a substantially single particle.

For example, the first cathode active material particle may have a granular or spherical single particle shape.

In example embodiments, the first cathode active material particle and a second cathode active material particle, which will be described later, may include a lithium-transition metal composite oxide particle.

For example, the lithium-transition metal composite oxide particle may have a single crystalline or polycrystalline structure from a crystallographic aspect.

For example, the lithium-transition metal composite oxide particles may include nickel (Ni), and may further include at least one of cobalt (Co) and manganese (Mn).

For example, the lithium-transition metal composite oxide particle may be represented by Chemical Formula 1 below.

[Chemical Formula 1]

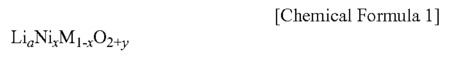

$$Li_aNi_xM_{1-x}O_{2+y}$$

In Chemical Formula 1, 0.9≤a≤1.2, 0.5≤x≤0.99, −0.1≤y≤0.1. M may represent at least one element selected from Na, Mg, Ca, Y, Ti, Hf, V, Nb, Ta, Cr, Mo, W, Mn, Co, Fe, Cu, Ag, Zn, B, Al, Ga, C, Si, Sn, Ba and Zr.

In some exemplary embodiments, the first cathode active material particle and/or the second cathode active material particle may further include a doping or a coating on a surface thereof. For example, the doping or the coating may include Al, Ti, Ba, Zr, Si, B, Mg, P, W, Na, V, Cu, Zn, Ge, Ag, Ba, Nb, Ga, Cr, Sr, Y, Mo, an alloy thereof or an oxide thereof. These may be used alone or in combination thereof. The first cathode active material particles and/or the second cathode active material particles may be passivated by the doping or the coating, so that penetration stability and life-span may be further improved.

In some preferable embodiments, a molar ratio or concentration (x) of Ni in Chemical Formula 1 may be greater than or equal to 0.8, more preferably greater than 0.8, and, in an embodiment, greater than or equal to 0.98.

Ni may serve as a transition metal related to power and capacity of a lithium secondary battery. Therefore, as described above, the high-Ni composition may be introduced in the lithium-transition metal composite oxide particle, so that high-power cathode and lithium secondary battery may be provided.

However, as the content of Ni increases, long-term storage and life-span stability of the cathode or the secondary battery may be relatively deteriorated. However, according to exemplary embodiments, life-span stability and capacity retention may be improved through Mn while maintaining electrical conductivity by including Co.

For example, the lithium-transition metal composite oxide particles may be in the form of the secondary particle formed by the primary particles assembled therein. However, in this case, micro-cracks may be formed at an inside of the secondary particle during charging and discharging of the battery, and a side reaction between the electrolyte and the cathode active material may be accelerated and a gas may be generated within the battery. Accordingly, life-span properties of the secondary battery may be deteriorated as charging and discharging are repeatedly performed.

According to exemplary embodiments of the present invention, the cathode active material may include the lithium-transition metal composite oxide particles of the single particle shape (e.g., first cathode active material particles). Thus, cracks of the particles may be reduced, and the BET surface area reacting with the electrolyte may be reduced. Accordingly, the life-span properties of the secondary battery and the capacity retention during repeated charging and discharging may be improved.

In some embodiments, the cathode active material may further include second cathode active material particles having the secondary particle shape, and a content of the first cathode active material particles based on the total weight of the cathode active material may be in a range from 10 weight percent (wt %) to 40 wt %. Within the above range, mechanical and chemical stability of the secondary battery may be improved and an excessive reduction of the particle surface area may be prevented. Therefore, the life-span properties may be improved while maintaining capacity properties of the battery.

The above-described cathode active material may be mixed and stirred with a binder, a conductive material and/or a dispersive agent in a solvent to prepare a slurry. The slurry may be coated on the cathode current collector 105, and dried and pressed to form the cathode 100.

The cathode current collector 105 may include, e.g., stainless steel, nickel, aluminum, titanium, copper or an alloy thereof, and may preferably include aluminum or an aluminum alloy.

For example, the binder may include an organic based binder such as polyvinylidenefluoride (PVDF), a polyvinylidene fluoride-hexafluoropropylene copolymer (PVDF-co-HFP), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on the anode current collector 125.

The anode active material may include a widely known material in the related art which may be capable of adsorbing and ejecting lithium ions. For example, the anode active material may include a carbon-based material such as a crystalline carbon, an amorphous carbon, a carbon complex, a carbon fiber, etc., a lithium alloy, a silicon-based material, tin, etc.

The amorphous carbon may include, e.g., a hard carbon, cokes, a mesocarbon microbead (MCMB), a mesophase pitch-based carbon fiber (MPCF), etc.

The crystalline carbon may include, e.g., an artificial graphite, natural graphite, graphitized cokes, graphitized MCMB, graphitized MPCF, etc.

For example, the lithium alloy may include a metal element such as aluminum, zinc, bismuth, cadmium, antimony, silicon, lead, tin, gallium, indium, etc.

The silicon-based compound may include, e.g., silicon oxide, a silicon-carbon composite compound such as silicon carbide (SiC).

For example, the anode active material may be mixed and stirred together with the above-described binder and conductive material, a thickener, etc., in a solvent to form a slurry. The slurry may be coated on at least one surface of the anode current collector 125, dried and pressed to obtain the anode 130.

A separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation.

In exemplary embodiments, an electrode cell may be defined by the cathode 100, the anode 130 and the separation layer 140, and a plurality of the electrode cells may be stacked to form an electrode assembly 150 that may have e.g., a jelly roll shape.

For example, the electrode assembly 150 may be formed by winding, laminating or folding the separation layer 140.

The electrode assembly 150 may be accommodated together with a non-aqueous electrolyte in a case 160 to define the lithium secondary battery.

The non-aqueous electrolyte includes a non-aqueous organic solvent including a fluorine-based organic solvent, a lithium salt and an additive.

For example, a fluorine content in the non-aqueous electrolyte may be increased by using the fluorine-based organic solvent. Accordingly, an oxidation resistance of the secondary battery may be improved. Thus, the life-span properties of the secondary battery may be improved and an amount of gas generated at high temperature may be reduced.

Additionally, a side reaction between the cathode active material particles and the non-aqueous electrolyte may be further suppressed by using the above-described cathode active material including the first cathode active material particles in the form of the single particle together with the non-aqueous electrolyte solution including the fluorine-based organic solvent. Thus, an additional synergistic effect of improving the life-span and high-temperature storage properties may be implemented.

In some embodiments, the non-aqueous organic solvent may include a monofluoro-based organic solvent or a difluoro-based organic solvent.

The term "monofluoro-based organic solvent" used herein may refer to a compound containing one fluorine (F) atom in one molecule, and "difluoro-based organic solvent" may refer to a compound containing two fluorine (F) atoms in one molecule.

In some embodiments, the monofluoro-based organic solvent may be represented by Chemical Formula 2 below.

[Chemical Formula 2]

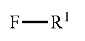

In Chemical Formula 2, $R^1$ is a substituted or unsubstituted $C_1$-$C_6$ alkyl group, a substituted or unsubstituted $C_6$-$C_{12}$ aryl group, a substituted or unsubstituted $C_5$-$C_{12}$ cycloalkyl group, a substituted or unsubstituted $C_5$-$C_{12}$ cycloalkenyl group, a substituted or unsubstituted 5 to 7 membered heterocycloalkyl group, or a substituted or unsubstituted 5 to 7 membered heterocycloalkenyl group.

The term "$C_n$" (n is a natural number) used herein refers to the number of carbon atoms.

For example, the above-described mono-fluoro organic solvent may be included in the non-aqueous organic solvent to sufficiently improve the oxidation resistance of the battery while preventing a reduction of capacity retention due to an excessive addition of the di-fluoro organic solvent as described later.

In an embodiment, the monofluoro-based organic solvent may include fluoroethylene carbonate (FEC).

In exemplary embodiments, the difluoro-based organic solvent may be represented by Chemical Formula 3 below.

[Chemical Formula 3]

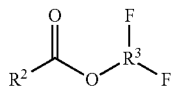

In Chemical Formula 3, $R^2$ may be a hydrocarbon containing a substituted or unsubstituted $C_1$-$C_6$ alkyl group or a substituted or unsubstituted $C_6$-$C_{12}$ aryl group, and $R^3$ may be a hydrocarbon including a substituted or unsubstituted $C_1$-$C_6$ alkyl group or a substituted or unsubstituted $C_2$-$C_6$ alkenyl group.

For example, a substituent included in $R^1$ to $R^3$ may include at least one selected from the group consisting of a halogen, a $C_1$-$C_6$ alkyl group, a $C_3$-$C_6$ cycloalkyl group, a $C_1$-$C_6$ alkoxy group, a 3 to 7 membered hetero cycloalkyl group, a $C_6$-$C_{12}$ aryl group, a 5 to 7 membered heteroaryl group, a hydroxyl group (—OH), —$NR^4R^5$ ($R^4$ and $R^5$ are each independently hydrogen or a $C_1$-$C_6$ alkyl group), a nitro group (—$NO_2$) and a cyano group (—CN).

For example, a fluorine content in the electrolyte may be increased by using the above-described difluoro-based organic solvent together with the monofluoro-based organic solvent. In this case, the oxidation resistance of the secondary battery may be improved. Accordingly, life-span properties of the secondary battery may be improved and an amount of gas generated at a high temperature may be reduced.

For example, if only the monofluoro-based organic solvent is used, sufficient fluorine content in the electrolyte may not be achieved, and the oxidation resistance of the battery may not be sufficiently improved.

In one embodiment, the difluoro-based organic solvent may include difluoroethyl acetate (DFA).

In some embodiments, the non-aqueous organic solvent may further include a non-fluorine-based organic solvent, and a volume ratio of the fluorine-based organic solvent relative to the non-fluorine-based organic solvent may be in a range from 1.5 to 9. Within this range, a reduction of the capacity retention of the battery due to an excessive fluorine input may be prevented while sufficiently maintaining the fluorine content in the electrolyte.

In some embodiments, the non-fluorine-based organic solvent may include at least one selected from the group consisting of a carbonate-based solvent, an ester-based solvent, an ether-based solvent, a ketone-based solvent, an alcohol-based solvent and an aprotic solvent. These may be used alone or in a combination thereof.

For example, the carbonate-based solvent may include at least one of dimethyl carbonate (DMC), ethyl methyl carbonate (EMC), methyl propyl carbonate, ethyl propyl carbonate, diethyl carbonate (DEC), dipropyl carbonate, propylene carbonate (PC), ethylene carbonate (EC) and butylene carbonate.

For example, the ester-based solvent may include at least one of methyl acetate (MA), ethyl acetate (EA), n-propyl acetate (n-PA), 1,1-dimethylethyl acetate (DMEA), methyl propionate (MP), ethyl propionate (EP), γ-butyrolactone (GBL), decanolide, valerolactone, mevalonolactone and caprolactone.

For example, the ether-based solvent may include at least one of dibutyl ether, tetraethylene glycol dimethyl ether (TEGDME), diethylene glycol dimethyl ether (DEGDME), dimethoxyethane, tetrahydrofuran (THF) and 2-methyltetrahydrofuran.

For example, the ketone-based solvent may include cyclohexanone, etc.

For example, the alcohol-based solvent may include at least one of ethyl alcohol and isopropyl alcohol.

For example, the aprotic solvent may include at least one selected from the group consisting of a nitrile-based solvent, an amide-based solvent (e.g., dimethylformamide), a dioxolane-based solvent (e.g., 1,3-dioxolane) and a sulfolane-based solvent.

In exemplary embodiments, a lithium salt may be provided as an electrolyte. For example, the lithium salt may be expressed as $Li^+X^-$.

For example, the anion $X^-$ may be $F^-$, $Cl^-$, Br, $I^-$, $NO_3^-$, $N(CN)_2^-$, $BF_4^-$, $ClO_4^-$, $PF_6^-$, $SbF_6^-$, $ASF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3$ $(CF_2)_7SO_3^-$, $CF_3CO_2^-$, $CH_3CO_2^-$, $SCN^-$, $(CF_3CF_2SO_2)_2N^{31}$ and $PO_2F_2^-$. These may be used alone or in a combination thereof.

In some embodiments, the lithium salt may include at least one of lithium tetrafluoroborate ($LiBF_4$), lithium hexafluorophosphate ($LiPF_6$), and lithium difluorophosphate ($LiPO_2F_2$). In this case, a film having improved thermal stability may be formed on a surface of the electrode. Accordingly, improved ion conductivity and electrode protection properties of the non-aqueous electrolyte may be implemented.

In an embodiment, the lithium salt may be included in a concentration from about 0.01 M to 5 M, preferably from about 0.01 M to 2 M with respect to the non-aqueous organic solvent. Within the above range, transfer of lithium ions and/or electrons may be promoted during charging and discharging of the lithium secondary battery, so that improved capacity may be achieved.

In exemplary embodiments, the additive may include a boron-based compound.

For example, the boron-based compound may include at least one of lithium bis(oxalate) borate (LiBOB), tris(trimethylsilyl) borate (TMSB) and lithium difluoro(oxalato) borate (LiFOB).

When the above-described boron-based compound is included as the additive, a side reaction between the fluorine-based organic solvent and the anode may be suppressed. Accordingly, deterioration of the storage and life-span properties of the anode may be prevented while using the monofluoro-based organic solvent and the difluoro-based organic solvent as described above.

In some embodiments, a content of the additive based on a total weight of the non-aqueous electrolyte may be in a range from 0.1 wt % to 1.0 wt %. Within this range, an excessive increase of the battery resistance may be avoided while improving high-temperature storage and life-span properties by using the additive. Thus, degradation of capacity and power properties may be prevented while improving the high-temperature storage properties of the secondary battery.

In exemplary embodiments, the above-described non-aqueous electrolyte solution may further include an auxiliary additive including an alkyl sultone-based compound and an alkenyl sultone-based compound.

For example, the alkyl sultone-based compound may include at least one of 1,3-propane sultone (PS) and 1,4-butane sultone.

For example, the alkenyl sultone-based compound may include at least one of ethensultone, 1,3-propene sultone (PRS), 1,4-butene sultone and 1-methyl-1,3-propene sultone.

The above-described auxiliary additive may further include an anhydride-based compound such as succinic anhydride and maleic anhydride, a nitrile-based compound such as glutaronitrile, succinonitrile and adiponitrile, etc. These may be used alone or in a combination thereof in addition to the above-mentioned sultone-based compound.

In an embodiment, the auxiliary additive may further include at least one of polyethylene sulfide (PES), vinylene carbonate (VC) and vinylethylene carbonate (VEC).

In some embodiments, a content of the auxiliary additive based on the total weight of the non-aqueous electrolyte may be in a range from 0.5 wt % to 1.5 wt %. Within this range, the above-described side reaction of the additive may be further suppressed while suppressing an excessive increase of the battery resistance. Accordingly, the reduction of capacity may be suppressed while maintaining or improving the life-span properties of the secondary battery by using the above-described fluoro-based organic solvent.

As illustrated in FIG. 1, electrode tabs (a cathode tab and an anode tab) may protrude from the cathode current collector 105 and the anode current collector 125 included in each electrode cell to one side of the case 160. The electrode tabs may be welded together with the one side of the case 160 to be connected to an electrode lead (a cathode lead 107 and an anode lead 127) that may be extended or exposed to an outside of the case 160.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

(1) Preparation of Cathode Active Material $NiSO_4$, $CoSO_4$ and $MnSO_4$ were mixed at a molar ratio of 0.8:0.1:0.1, respectively, using distilled water from which an internal dissolved oxygen was removed by bubbling with $N_2$ for 24 hours. The mixed solution was added to a reactor at 50° C., and NaOH and $NH_3H_2O$ were added as a precipitant and a chelating agent, respectively. Thereafter, a co-precipitation reaction was performed for 72 hours to obtain $Ni_{0.8}Co_{0.1}Mn_{0.1}(OH)_2$ as a transition metal precursor. The obtained precursor was dried at 100° C. for 12 hours and then redried at 120° C. for 10 hours.

Lithium hydroxide and the transition metal precursor were added to a dry high-speed mixer at a ratio of 1.03:1 and mixed uniformly for 20 minutes. The mixture was put into a kiln and heated up to 950° C. at a heating rate of 2° C./min, and left for 12 hours while maintaining a temperature at 950° C.

Oxygen was continuously passed through at a flow rate of 10 mL/min during the temperature elevation and maintenance. After the firing, natural cooling was performed to room temperature, followed by pulverization and classification to prepare first cathode active material particles in the form of single particles having a composition of $LiNi_{0.8}Co_{0.1}Mn_{0.1}O_2$.

A cathode active material was prepared by mixing the lithium-transition metal composite oxide particles in the form of the single particles as described above with second cathode active material particles in the form of secondary particles (composition: $LiNi_{0.8}Co_{0.1}Mn_{0.1}O_2$).

A content of the first cathode active material particles relative to the total weight of the cathode active material was adjusted to 30 wt %.

(2) Preparation of Non-Aqueous Electrolyte

A 1M $LiPF_6$ solution was prepared using a mixed solvent of PC/FEC/DFEA(21:4:75; weight ratio). PC was used as a non-fluoro-based organic solvent, FEC was used as a monofluoro-based organic solvent, and DFEA was used as a difluoro-based organic solvent.

Thereafter, lithium bisoxalato borate (LiBOB) as an additive was added and mixed with the solution with an amount of 0.85 wt % based on a total weight of a non-aqueous electrolyte.

Additionally, 1.0 wt % of 1,3-propanesultone (PS) and 0.5 wt % of 1,3-propenesultone (PRS) (total 1.5 wt %) as auxiliary additives based on the total weight of the non-aqueous electrolyte was added and mixed to prepare the non-aqueous electrolyte.

(3) Fabrication of Lithium Secondary Battery

The cathode active material as prepared above, carbon black as a conductive material and polyvinylidene fluoride (PVdF) as a binder were mixed in a weight ratio of 92:5:3 to form a slurry. The slurry was uniformly coated on an aluminum foil having a thickness of 15 μm and vacuum dried at 130° C. to prepare a cathode for a lithium secondary battery.

An anode slurry containing 95 wt % of natural graphite as an anode active material, 1 wt % of Super-P as a conductive material, 2 wt % of styrene-butadiene rubber (SBR) as a binder and 2 wt % of carboxymethyl cellulose (CMC) as a thickener was prepared. The anode slurry was uniformly coated on a copper foil having a thickness of 15 μm, dried and pressed to form an anode.

The cathode and the anode prepared as described above were each notched by a predetermined size, and stacked with a separator (polyethylene, thickness: 20 μm) interposed therebetween to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions. The non-aqueous electrolyte as prepared in the above (2) was injected through the electrolyte injection side, and then the electrolyte injection side was also sealed. Impregnation was performed for more than 12 hours to obtain a lithium secondary battery.

Example 2

A cathode active material, a non-aqueous electrolyte and a lithium secondary battery were prepared by the same method as that in Example 1, except that the content of the first cathode active material particles was 15 wt % based on the total weight of the cathode active material when preparing the cathode active material.

Example 3

A cathode active material, a non-aqueous electrolyte and a lithium secondary battery were prepared by the same method as that in Example 1, except that the content of the first cathode active material particles was 8 wt % based on the total weight of the cathode active material when preparing the cathode active material.

Example 4

A cathode active material, a non-aqueous electrolyte and a lithium secondary battery were prepared by the same method as that in Example 1, except that the content of the first cathode active material particles was 43 wt % based on the total weight of the cathode active material.

Example 5

A cathode active material, a non-aqueous electrolyte and a lithium secondary battery were prepared by the same method as that in Example 1, except that a mixed solvent of PC/FEC/DFA (8:10:82; volume ratio) was used as the non-aqueous organic solvent when preparing the non-aqueous electrolyte.

Example 6

A cathode active material, a non-aqueous electrolyte and a lithium secondary battery were prepared by the same method as that in Example 1, except that a mixed solvent of PC/FEC/DFA (50:5:45; volume ratio) was used as the non-aqueous organic solvent when preparing the non-aqueous electrolyte.

Example 7

A cathode active material, a non-aqueous electrolyte and a lithium secondary battery were prepared by the same method as that in Example 1, except that LiBOB was added as an additive in an amount of 0.08 wt % based on the total weight of the non-aqueous electrolyte when preparing the non-aqueous electrolyte.

Example 8

A cathode active material, a non-aqueous electrolyte and a lithium secondary battery were prepared by the same method as that in Example 1, except that LiBOB was added as an additive in an amount of 1.1 wt % based on the total weight of the non-aqueous electrolyte when preparing the non-aqueous electrolyte.

Example 9

A cathode active material, a non-aqueous electrolyte and a lithium secondary battery were prepared by the same method as that in Example 1, except that 0.3 wt % of PS and 0.1 wt % of PRS (total 0.4 wt %) were added as the auxiliary additive based on the total weight of the non-aqueous electrolyte when preparing the non-aqueous electrolyte.

Example 10

A cathode active material, a non-aqueous electrolyte and a lithium secondary battery were prepared by the same method as that in Example 1, except that 1.3 wt % of PS and 0.3 wt % of PRS (total 1.6 wt %) were added as the auxiliary additive based on the total weight of the non-aqueous electrolyte when preparing the non-aqueous electrolyte.

Comparative Example 1

A cathode active material, a non-aqueous electrolyte and a lithium secondary battery were prepared by the same method as that in Example 1, except that only the second cathode active material particles were used as the cathode active material, and a mixed solvent of EC/EMC (25:75; volume ratio) was used as the non-aqueous organic solvent.

Comparative Example 2

A cathode active material, a non-aqueous electrolyte and a lithium secondary battery were prepared by the same method as that in Example 1, except that a mixed solvent of EC/EMC (25:75; volume ratio) was used as the non-aqueous organic solvent when preparing the non-aqueous electrolyte.

Comparative Example 3

A cathode active material, a non-aqueous electrolyte and a lithium secondary battery were prepared by the same method as that in Example 1, except that only the second cathode active material particles were used as the cathode active material.

The contents of the first cathode active material particles among the cathode active material, the volume ratios of the fluorine-based organic solvent to the non-fluorine-based organic solvent, the contents of additives, and the contents of auxiliary additives of Examples and Comparative Examples described above are shown in Table 1 below.

TABLE 1

| No. | content of first cathode active material particles (wt %) | volume ratio of fluorine-based organic solvent to non-fluorine-based organic solvent | content of additive (wt %) | content of auxiliary additive (wt %) |
|---|---|---|---|---|
| Example 1 | 30 | 3.76 | 0.85 | 1.5 |
| Example 2 | 15 | 3.76 | 0.85 | 1.5 |
| Example 3 | 8 | 3.76 | 0.85 | 1.5 |
| Example 4 | 43 | 3.76 | 0.85 | 1.5 |
| Example 5 | 30 | 11.5 | 0.85 | 1.5 |
| Example 6 | 30 | 1.0 | 0.85 | 1.5 |
| Example 7 | 30 | 3.76 | 0.08 | 1.5 |
| Example 8 | 30 | 3.76 | 1.1 | 1.5 |
| Example 9 | 30 | 3.76 | 0.85 | 0.4 |
| Example 10 | 30 | 3.76 | 0.85 | 1.6 |
| Comparative Example 1 | — | — | 0.85 | 1.5 |
| Comparative Example 2 | 30 | — | 0.85 | 1.5 |
| Comparative Example 3 | — | 3.76 | 0.85 | 1.5 |

Experimental Example (1) Evaluation on Electrochemical Stability—LSV (Linear Sweep Voltammetry) Analysis A voltage seeping was performed at a constant speed in each lithium secondary battery according to Examples and Comparative Examples, and a voltage at a point where the electrolyte solution was decomposed to generate a current was measured. Specifically, the measurement was performed at a scan rate of 0.05 mV/s to 1.0 mV/s in a voltage range of 3V to 7V using Solartron's LSV measuring device. When measuring the LSV, a platinum electrode was used as a working electrode, and a lithium metal was used as reference and counter electrodes.

For example, the secondary battery can be regarded as being electrochemically stable as the electrolyte is decomposed at a high voltage.

(2) Evaluation on Initial Performance

1) Measurement of Initial Capacity

Charge (CC/CV 1/3C 4.2V 0.05C CUT-OFF) and discharge (CC 1/3C 2.5V CUT-OFF) were performed on each lithium secondary battery according to the above-described Examples and Comparative Examples, and an initial discharge capacity was measured.

2) Measurement on Discharge DCIR

C-rates were increased or decreased sequentially as 0.2C, 0.5C, 1.0C, 1.5C, 2.0C, 2.5C and 3.0C at the point where an SOC (State of Charge) of each lithium secondary battery of Examples and Comparative Examples was set to 60%. When the charging and discharging of the corresponding C-rate was performed for 10 seconds, an end point of a voltage was estimated by an equation of a straight line, and a slope was adopted as a DCIR (Direct Current Internal Resistance).

(3) Evaluation on High Temperature Life-Span Properties (45° C.)

Charging (CC/CV 1C 4.3V 0.1C CUT-OFF) and discharging (CC 1C 2.5V CUT-OFF) were repeated 700 times for each lithium secondary battery according to Examples and Comparative Examples in a chamber at 45° C.

Measurement of Capacity Retention (45° C.)

A capacity retention of each lithium secondary battery was calculated as a percentage by dividing a discharge capacity at the 700th cycle by the initial capacity measured in Experimental Example (2)1).

Capacity retention rate (%)=(700th discharge capacity/initial capacity)×100

(4) Evaluation on High Temperature Storage Properties (60° C.)

Each lithium secondary battery according to Examples and Comparative Examples was left in a chamber at 60° C. for 8 weeks, and then the following evaluations were performed.

1) Measurement of capacity retention (60° C.)

The lithium secondary battery was discharged (CC 1/3C 2.5V CUT-OFF) to measure a discharge capacity. The discharge capacity was calculated as a percentage by dividing the discharge capacity by the initial capacity measured in Experimental Example (2)1).

The measurement of the discharge capacity was performed in the same method as that in Experimental Example (2) 1).

2) Measurement of Gas Generation

The lithium secondary battery left for 8 weeks in the chamber at 60° C., further left for another 4 weeks under the same conditions, and then left at room temperature for 30 minutes and placed in a chamber to measure a gas generation. After forming a vacuum in the chamber, a nitrogen gas was filled to form a normal pressure. A nitrogen volume ($V_0$) and a chamber internal pressure ($P_0$) were measured. After forming a vacuum at an inside of the chamber again, a hole was formed in the battery, and a pressure inside the chamber ($P_1$) was measured. An amount of gas generation was calculated according to the following equation.

$$\text{Gas generation amount (mL)} = (V_0/P_0) * P_1$$

The evaluation results according to the above-described Experimental Examples are shown in Tables 2 and 3 below.

TABLE 2

| No. | LSV (V) | initial performance: initial capacity (Ah) | initial performance: DCIR (mΩ) |
|---|---|---|---|
| Example 1 | 5.96 | 19.1 | 4.40 |
| Example 2 | 5.91 | 20.3 | 4.48 |
| Example 3 | 5.81 | 21.5 | 4.53 |
| Example 4 | 5.98 | 18.2 | 4.35 |
| Example 5 | 6.03 | 18.7 | 4.40 |
| Example 6 | 5.65 | 18.6 | 4.41 |
| Example 7 | 5.95 | 19.0 | 4.41 |
| Example 8 | 5.93 | 17.9 | 4.52 |
| Example 9 | 5.91 | 19.2 | 4.42 |
| Example 10 | 5.91 | 18.0 | 4.50 |
| Comparative Example 1 | 5.26 | 19.1 | 4.68 |

TABLE 2-continued

| No. | LSV (V) | initial performance initial capacity (Ah) | DCIR (mΩ) |
|---|---|---|---|
| Comparative Example 2 | 5.45 | 19.0 | 4.42 |
| Comparative Example 3 | 5.53 | 18.8 | 4.70 |

TABLE 3

| No. | high temperature life-span (45° C., 700 cycles) capacity retention (%) | high temperature storage (60° C.) capacity retention (%) | gas generation (mL) |
|---|---|---|---|
| Example 1 | 87 | 95 | 7.20 |
| Example 2 | 86 | 94 | 7.41 |
| Example 3 | 82 | 90 | 9.55 |
| Example 4 | 90 | 97 | 5.32 |
| Example 5 | 83 | 89 | 7.03 |
| Example 6 | 82 | 90 | 8.11 |
| Example 7 | 82 | 91 | 7.37 |
| Example 8 | 86 | 94 | 7.18 |
| Example 9 | 82 | 89 | 7.56 |
| Example 10 | 87 | 95 | 6.98 |
| Comparative Example 1 | 74 | 81 | 18.18 |
| Comparative Example 2 | 77 | 85 | 13.10 |
| Comparative Example 3 | 78 | 85 | 14.05 |

Referring to Tables 2 and 3, in Examples where the cathode active material including the first cathode active material particle in the form of single particles and the fluorine-based organic solvent were used together, improved initial capacity, high-temperature life-span properties and high-temperature storage properties compared to those from Comparative examples were provided.

In Example 3 where the content of the first cathode active material particles was less than 10 wt %, the capacity retention at high temperature was relatively reduced.

In Example 4 where the content of the first cathode active material particles in the cathode active material exceeded 40 wt %, the initial capacity was relatively lowered.

In Example 5 where the volume of the fluorine-based organic solvent exceeded 9 times the volume of the non-fluorine-based organic solvent, the capacity retention was relatively reduced.

In Example 6 where the volume of the fluorine-based organic solvent was less than 1.5 times the volume of the non-fluorine-based organic solvent, the life-span and storage properties at high temperature were relatively degraded.

In Example 7 where the additive content was less than 0.1 wt % based on the total weight of the non-aqueous electrolyte, a side reaction of the electrode and the fluorine-based organic solvent was not sufficiently suppressed, and the life-span and storage properties at high temperature were relatively deteriorated.

In Example 8 where the content of the additive based on the total weight of the non-aqueous electrolyte solution exceeded 1.0 wt %, the initial capacity was relatively lowered as the battery resistance increased.

In Example 9 where the content of the auxiliary additive was less than 0.5 wt % based on the total weight of the non-aqueous electrolyte, the life-span and storage properties were relatively degraded.

In Example 10 where the content of the auxiliary additive based on the total weight of the non-aqueous electrolyte exceeded 1.5 wt %, the initial capacity was relatively lowered as the battery resistance increased.

In Comparative Example 1 where the single particle was not included in the cathode active material and the fluorine-based organic solvent was not used, the storage and life-span properties at high temperature were remarkably deteriorated.

In Comparative Example 2, the single particle was included in the cathode active material, but the fluorine-based organic solvent was not used. In Comparative Example 3, the single particle was not included in the cathode active material, but the fluorine-based organic solvent was used.

In Comparative Examples 2 and 3, the storage and life-span properties were explicitly deteriorated compared to those from Examples.

What is claimed is:

1. A lithium secondary battery, comprising:

a cathode comprising a cathode current collector and a cathode active material layer disposed on at least one surface of the cathode current collector, the cathode active material layer comprising a cathode active material including first cathode active material particles, each of which has a single particle shape;

an anode facing the cathode; and a non-aqueous electrolyte comprising a non-aqueous organic solvent that contains a fluorine-based organic solvent, a lithium salt and an additive, wherein the cathode active material further comprises second cathode active material particles, each of which has a secondary particle shape, and a content of the first cathode active material particles based on a total weight of the cathode active material is in a range from 10 wt % to 40 wt %, wherein the non-aqueous organic solvent further comprises a non-fluorine-based organic solvent, wherein a volume ratio of the fluorine-based organic solvent to the non-fluorine- based organic solvent is in a range from 1.5 to 9, wherein the volume ratio is defined as a ratio of a total volume of the fluorine-based organic solvent to a total volume of the non-fluorine-based organic solvent, wherein the non-fluorine-based organic solvent includes at least one selected from the group consisting of a carbonate-based solvent, an ester-based solvent, an ether-based solvent, a ketone-based solvent, an alcohol-based solvent and an aprotic solvent, wherein the fluorine-based organic solvent includes a monofluoro-based organic solvent and a difluoro-based organic solvent, wherein the monofluoro-based organic solvent is represented by Chemical Formula 2:

[Chemical Formula 2]

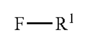

wherein, in Chemical Formula 2, $R^1$ is a substituted or unsubstituted $C_1$-$C_6$ alkyl group, a substituted or unsubstituted $C_6$-$C_{12}$ aryl group, a substituted or unsubstituted $C_5$-$C_{12}$ cycloalkyl group, a substituted or unsubstituted $C_5$-$C_{12}$ cycloalkenyl group, a substituted or unsubstituted 5 to 7 membered heterocycloalkyl group, or a substituted or unsubstituted 5 to 7 membered heterocycloalkenyl group, and wherein the difluoro-based organic solvent is represented by Chemical Formula 3:

[Chemical Formula 3]

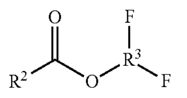

wherein, in Chemical Formula 3, $R^2$ is a hydrocarbon containing a substituted or unsubstituted $C_1$-$C_6$ kyl group or a substituted or unsubstituted $C_6$-$C_{12}$ aryl group, and R3 is a hydrocarbon including a substituted or unsubstituted $C_1$-$C_6$ alkyl group or a substituted or unsubstituted $C_2$-$C_6$ alkenyl group.

2. The lithium secondary battery of claim 1, wherein the first cathode active material particles or the second cathode active material particles have a structure of a lithium-transition metal composite oxide particle represented by Chemical Formula 1:

[Chemical Formula 1]

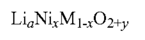

wherein, in Chemical Formula 1, $0.9 \le a \le 1.2$, $0.5 \le x \le 0.99$, $-0.1 \le y \le 0.1$, and M includes at least one element selected from Na, Mg, Ca, Y, Ti, Hf, V, Nb, Ta, Cr, Mo, W, Mn, Co, Fe, Cu, Ag, Zn, B, Al, Ga, C, Si, Sn, Ba and Zr.

3. The lithium secondary battery of claim 1, wherein the additive includes a boron-based compound.

4. The lithium secondary battery of claim 3, wherein the boron-based compound includes at least one of lithium bis (oxalate) borate (LiBOB), tris (trimethylsilyl) borate (TMSB) and lithium difluoro (oxalato) borate (LiFOB).

5. The lithium secondary battery of claim 1, wherein a content of the additive is in a range from 0.1 wt % to 1.0 wt % based on a total weight of the non-aqueous electrolyte.

6. The lithium secondary battery of claim 1, wherein the non-aqueous electrolyte further comprises an auxiliary additive including an alkyl sultone-based compound and an alkenyl sultone-based compound.

7. The lithium secondary battery of claim 6, wherein a content of the auxiliary additive is in a range from 0.5 wt % to 1.5 wt % based on a total weight of the non-aqueous electrolyte.

8. The lithium secondary battery of claim 1, wherein the lithium salt includes at least one of lithium tetrafluoroborate ($LiBF_4$), lithium hexafluorophosphate ($LiPF_6$) and lithium difluorophosphate ($LiPO_2F_2$).

* * * * *